(12) United States Patent
Fujiyama et al.

(10) Patent No.: US 7,324,024 B2
(45) Date of Patent: Jan. 29, 2008

(54) HIGH FREQUENCY COMPENSATOR AND REPRODUCING DEVICE

(75) Inventors: Koji Fujiyama, Osaka (JP); Naoya Iwasaki, Osaka (JP); Yumi Hirasawa, Kyoto (JP); Yutaka Yamamoto, 448, Kajiicho, Kawaramachi-Imadegawadori Sagaru Higashiiru, Kamigyo-ku, Kyoto-City, Kyoto 602-0841 (JP)

(73) Assignees: Sanyo Electric Co., Ltd., Moriguchi (JP); Yutaka Yamamoto, Kyoto (JP)

(*) Notice: Subject to any disclaimer, the term of this patent is extended or adjusted under 35 U.S.C. 154(b) by 0 days.

(21) Appl. No.: 11/307,926

(22) Filed: Feb. 28, 2006

(65) Prior Publication Data

US 2006/0267825 A1   Nov. 30, 2006

(30) Foreign Application Priority Data

Feb. 28, 2005   (JP)   ............................. 2005-054907

(51) Int. Cl.
*H03M 7/00* (2006.01)
(52) U.S. Cl. ...................... 341/61; 341/120; 348/392.1
(58) Field of Classification Search ................ 341/120; 348/392.1; 386/9; 345/204; 381/98, 103; 382/232
See application file for complete search history.

(56) References Cited

U.S. PATENT DOCUMENTS

| | | | | |
|---|---|---|---|---|
| 5,511,129 A | * | 4/1996 | Craven et al. | 381/103 |
| 5,561,463 A | * | 10/1996 | Thomas et al. | 348/392.1 |
| 5,596,418 A | * | 1/1997 | Strolle et al. | 386/9 |
| 6,219,387 B1 | * | 4/2001 | Glover | 375/341 |
| 6,226,616 B1 | * | 5/2001 | You et al. | 704/500 |
| 6,249,611 B1 | * | 6/2001 | Broussard et al. | 382/232 |
| 6,442,201 B2 | * | 8/2002 | Choi | 375/240.12 |
| 6,611,260 B1 | * | 8/2003 | Greenberg et al. | 345/204 |
| 6,760,451 B1 | * | 7/2004 | Craven et al. | 381/98 |
| 2003/0033611 A1 | * | 2/2003 | Shapiro et al. | 725/136 |
| 2003/0118177 A1 | * | 6/2003 | Karakas et al. | 379/406.01 |
| 2003/0169819 A1 | * | 9/2003 | Kutka et al. | 375/240.25 |
| 2003/0220801 A1 | * | 11/2003 | Spurrier | 704/503 |
| 2005/0027516 A1 | * | 2/2005 | Lee et al. | 704/219 |

FOREIGN PATENT DOCUMENTS

| | | |
|---|---|---|
| JP | 2001-127637 | 5/2001 |
| JP | 2002-073088 | 3/2002 |
| JP | 2002-073096 | 3/2002 |
| JP | 2002-116798 | 4/2002 |
| JP | 2004-080635 | 3/2004 |

* cited by examiner

*Primary Examiner*—Jean Bruner Jeanglaude
(74) *Attorney, Agent, or Firm*—NDQ&M Watchstone LLP; S. Peter Konzel

(57) ABSTRACT

A high frequency compensator configured to compensate high frequency component of a digital audio signal comprising a down sampler configured to perform ½ down-sampling for the digital audio signal. An up sampler is configured to perform double up-sampling for an output signal of the down-sampler. A digital low-pass filter is configured to filter an output signal of the up sampler, and to output the filtered digital audio signal.

3 Claims, 4 Drawing Sheets

HIGH FREQUENCY COMPENSATOR AND REPRODUCING DEVICE

CROSS REFERENCE TO RELATED APPLICATION AND INCORPORATION BY REFERENCE

This application is based upon and claims the benefit of priority from prior Japanese Patent Application P2005-054907 filed on Feb. 28, 2005; the entire contents of which are incorporated by reference herein.

BACKGROUND OF THE INVENTION

1. Field of the Invention

The present invention relates to a high frequency compensator for compensating high frequency component of a compressed digital audio signal such as a mini disk (MD), a moving picture experts group 1 audio layer 3 (MP3), and a digital audio broadcasting (DAB), and relates to a reproducing device includes the high frequency compensator and reproduces a digital audio signal.

2. Description of the Related Art

With respect to a compact disc (CD), an audio signal is a stereo signal having the sampling frequency of 44.1 kHz and the data bit length of 16 bits. A data rate can be expressed by the number of bits required for 1 second. The data rate of the CD is 1411.2 kbps. With respect to the MD, the data volume to be encoded is reduced by advanced transform acoustic coding (ATRAC) and ATRAC 3 which is an improved version of the ATRAC. The ATRAC and the ATRAC 3 are compression technologies for decimating a component that a human being can hardly hear and the data before and after big sound by utilizing the characteristic of human auditory sense. The ATRAC 3 is capable of the data compression rates of two times (mini disk long play mode (MDLP) 2, 132 kbps) and four times (MDLP 4, 66 kbps) those of the ATRAC. Therefore, the ATRAC 3 can compress an amount of data up to 1/20 level of the CD. However, as the compression rate becomes higher, the sound quality becomes deteriorated.

It is said that the audible frequency band of humans is from 20 Hz to 20 kHz. However, the audible frequency band varies between individuals, and it is considered that the upper limit for ordinal people is between 14 kHz and 15 kHz. Compression technologies have been developed in consideration of such audible frequency band, and pure sound (sine wave) is used for measuring the audible frequency band. However, in a real music or natural sound, sounds of a plurality of frequencies exist in mixed state. Therefore, there has been a widespreading idea that although a sound outside of the audible frequency band cannot be heard alone, it affects human audibility in terms of soundscape, or the like.

In Japanese Patent No. 3576941 and Japanese Patent No. 3576951, there is disclosed a frequency decimating device in which one of a pair of strongly correlated bands is removed, and in which the spectrum in a range of the other band is shortened to be onto a low frequency side, based on a spectrum distribution of a signal to be subjected to the decimating processing.

In Japanese Patent No. 3576942, there is disclosed a frequency compensating system in which when a signal is compensated, a portion having a higher spectrum distribution correlation of the spectrum of the signal to be compensated, is added along an envelope onto the high frequency side of the signal to be compensated, thereby expanding the band.

In Japanese Patent Laid-open No. 2004-80635, there is disclosed a signal encoding device which the spectrum in a limited band is encoded, the limited band corresponding to a predetermined frequency band of the input time series signal, and on the decoding side, in order to obtain the time series signal in the frequency band to be expanded based on a spectrum map, mapping information showing a mapping method is adaptively created, and the encoded spectrum in the limited band and the mapping information are output.

When a digital audio signal is compressed with a high compression rate and recorded, for example, in the MDLP 4, the frequency spectrum is only present up to 12 kHz level, as shown in FIG. 1B. Therefore, when it is compared with the CD signal shown in FIG. 1A, high frequency information is lost.

SUMMARY OF THE INVENTION

The object of the present invention is to provide a high frequency compensator capable of compensating information lost through the compression of a digital audio signal compressed with a high compression rate, and is to provide a reproducing device including the high frequency compensator.

A first aspect of the present invention inheres in a high frequency compensator configured to compensate high frequency component of a digital audio signal encompassing, a down sampler configured to perform ½ down-sampling for the digital audio signal, an up sampler configured to perform double up-sampling for an output signal of the down-sampler, and a digital low-pass filter configured to filter an output signal of the up sampler, and to output the filtered digital audio signal.

In the high frequency compensator according to the first aspect, the digital low-pass filter may be a digital filter for executing over-sampling processing, and a parameter of the digital low-pass filter is calculated by solving a conditional expression by utilizing Sampled-data control theory based on a predetermined condition, the condition expression being set to design an infinite impulse response filter in order that an error signal of an original analog audio signal having a limited band and an analog audio signal, which is generated by converting a digital signal generated after the original analog audio signal is converted into the digital signal, becomes small.

A second aspect of the present invention inheres in a high frequency compensator configured to compensate high frequency component of a digital audio signal encompassing, a zero replacer configured to replace even or odd sampling value of the digital audio signal to zero, and a digital low-pass filter configured to filter an output signal of the zero replacer, and to output the filtered digital audio signal.

In the high frequency compensator according to the second aspect, the digital low-pass filter may be a digital filter for executing over-sampling processing, and a parameter of the digital low-pass filter is calculated by solving a conditional expression by utilizing Sampled-data control theory based on a predetermined condition, the condition expression being set to design an infinite impulse response filter in order that an error signal of an original analog audio signal having a limited band and an analog audio signal, which is generated by converting a digital signal generated after the original analog audio signal is converted into the digital signal, becomes small.

A third aspect of the present invention inheres in a reproducing device comprising a high frequency compensator according to one of the first and second aspects, wherein a high frequency component of one of a digital audio signal read from a recording medium and a digital audio signal received from an external device is compensated by the high frequency compensator in order that the digital audio signal is reproduced.

DETAILED DESCRIPTION OF THE INVENTION

Figure 1A:
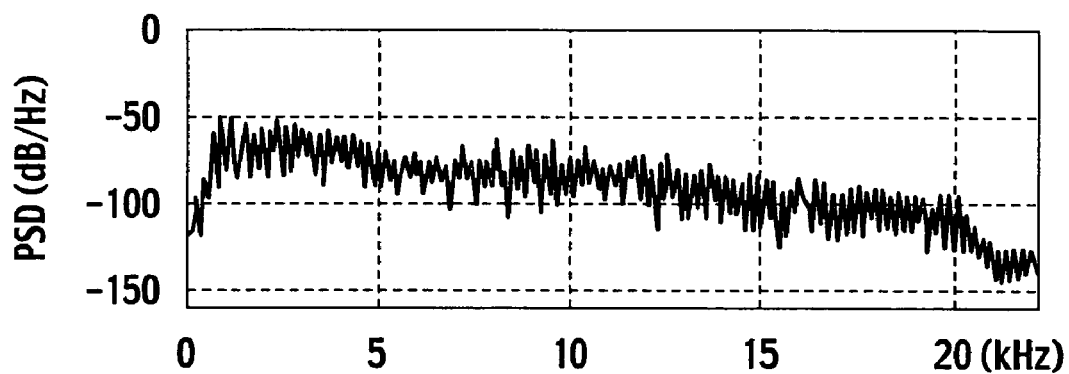
FIGS. 1A and 1B are frequency characteristic diagrams for explaining a problem to be solved.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

FIRST EMBODIMENT

Figure 2:
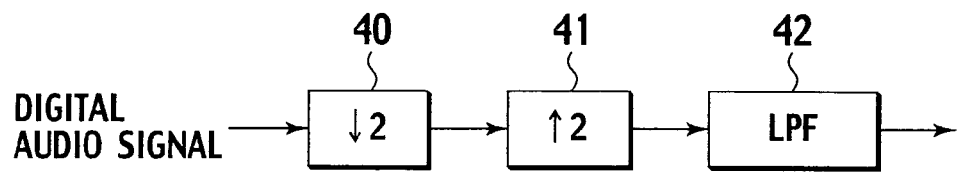
FIG. 2 is a block diagram showing a schematic configuration of a high frequency compensator according to a first embodiment of the present invention.
Figures 3A, 3B, 3C, 3D:
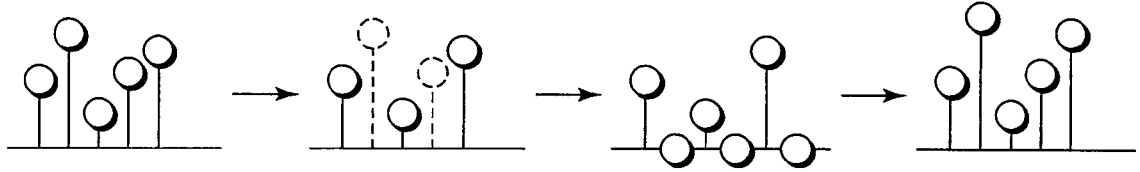
FIGS. 3A to 3D are schematic waveform diagrams for explaining an operation of the interpolator according to the first embodiment.

FIG. 2 is a block diagram showing a schematic configuration of a high frequency compensator according to a first embodiment of the present invention. In the high frequency compensator according to the first embodiment, a down sampler 40 performs ½ down-sampling of a compressed and expanded digital audio signal as shown in FIG. 3A, and a sampling value is decimated as shown in FIG. 3B. The digital audio signal subjected to the ½ down-sampling is supplied to an up sampler 41.

The up sampler 41 performs double up-sampling for the supplied digital audio signal, and inserts a sampling point with sampling value "0" at the midpoint of each sampling value (zero insertion), as shown in FIG. 3C. The digital audio signal having undergone the double up-sampling generates an axisymmetric spectrum (imaging component) with respect to its axis of symmetry, for example, 11 kHz (when the original sampling frequency is 44.1 kHz).

The digital audio signal having undergone the double up-sampling by the up sampler 41 is supplied to an infinite impulse response (IIR) or a finite impulse response (FIR) digital low-pass filter 42 together with an imaging component and is subjected to over-sampling. The over-sampling processing includes the double up-sampling processing in the up sampler 41.

As shown in FIG. 3D, with the over-sampling processing, the digital audio signal is compensated with the sampling value in the sampling point inserted with the zero insertion, and a high frequency component is generated to be output.

Figure 1B:
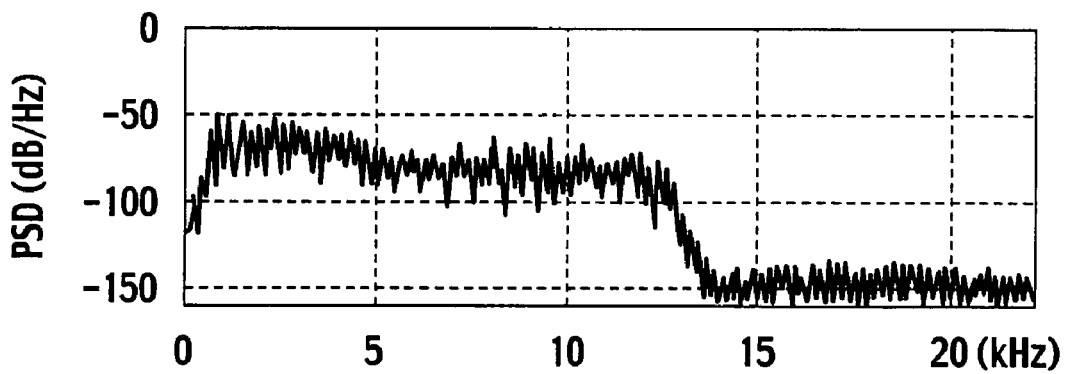
Figure 4:
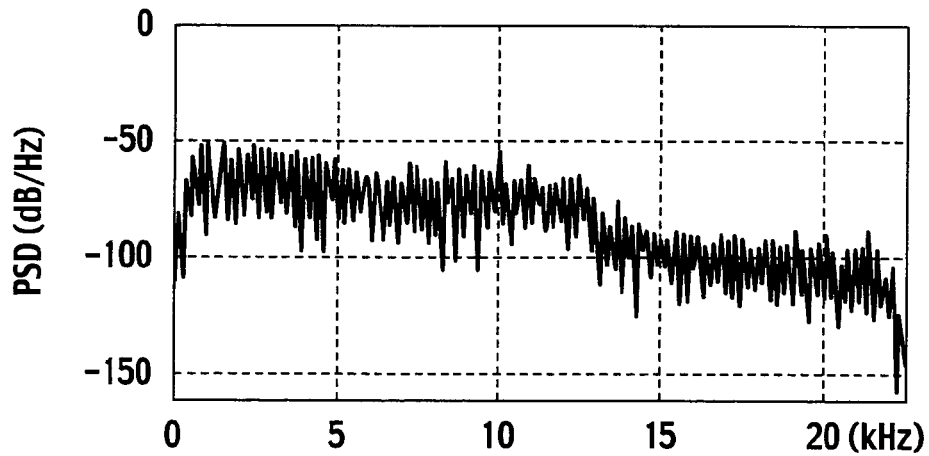
FIG. 4 is a frequency characteristic diagram for explaining the operation of the high frequency compensator according to the first embodiment.

As described above, a digital audio signal compressed by MDLP 4 and having the spectrum of about 12 kHz level or less as shown in FIG. 1B can be a digital audio signal having the spectrum up to about 20 kHz level as shown in FIG. 4 through the high frequency interpolation, for instance. As a result, it is possible to obtain an audio signal similar to the CD signal shown in FIG. 1A.

Accordingly, according to the high frequency compensator according to the first embodiment, the information lost through the compression of the digital audio data compressed with a high compression rate can be compensated.

Figure 5:
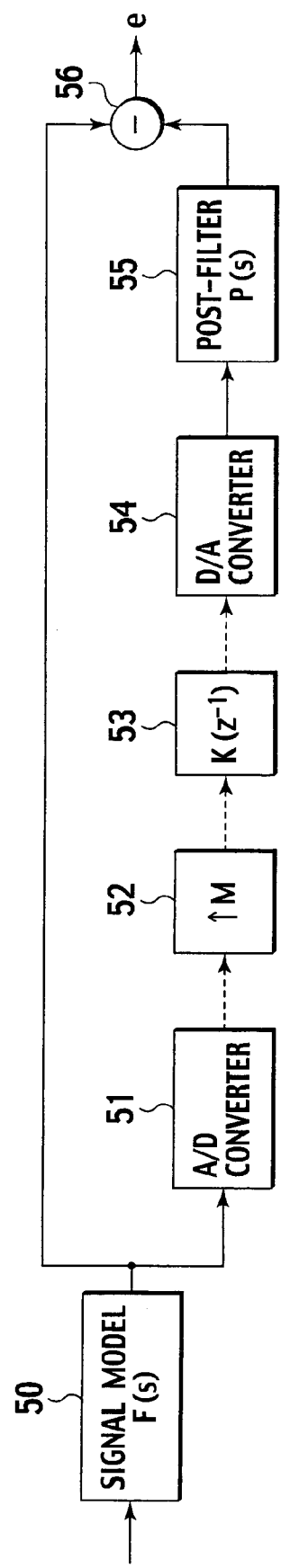
FIG. 5 is a block diagram of a signal decompression system model showing a method for calculating a parameter of a digital low-pass filter of the high frequency compensator.

FIG. 5 is a block diagram of a signal decompression system model showing a method for calculating a parameter of the digital low-pass filter 42. In the signal decompression system model, an analog signal from a signal model 50 having a function F(s) to be a model of a frequency characteristic of the original analog signal with its bandwidth limited is converted into a digital signal by an analog to digital (A/D) converter 51. The digital signal having been converted by the A/D converter 51 undergoes M-times up-sampling (M is an integer equal to or greater than two) in an up sampler 52.

The digital signal up-sampled to M times is given to a digital low-pass filter 53 and subjected to over sampling processing. The digital signal subjected to the over-sampling processing is converted into an analog signal by a digital to analog (D/A) converter 54, and then is supplied to a subtracter 56 after having been filtered by a post-filter 55 having a characteristic P(s). The subtracter 56 calculates an error signal "e" of the analog signal from the signal model 50 (when necessary, it is delayed) and the analog signal filtered by the post-filter 55, and outputs the error signal.

When a parameter of the digital low-pass filter 42 is calculated, a conditional expression is set in order to design an IIR digital low-pass filter 53 in order that the error signal "e" becomes small in the above described signal decompression system model. Next, a formula is obtained by converting this conditional expression approximately to a finite dimensional discrete time system. The obtained formula is solved by Sampled-data control theory based on a predetermined condition, whereby the parameter of the digital low-pass filter 53 (digital low-pass filter 42) is calculated.

It should be noted that the thus obtained digital low-pass filter is an IIR digital low-pass filter. However, for digital signal processing, an FIR filter is often used due to its ease of programming and implementation. In this case, a derived impulse response of the IIR filter is calculated, accordingly, it can be accurately realized as an FIR filter.

In the method for designing a digital low-pass filter as described above, the characteristics P(s) of an analog part such as the post-filter 55 is also taken into consideration. These analog characteristics are discretized (digitized) in a form without losing the information between the sampling points by lifting of the sampling value control theory. Therefore, an optimized design becomes possible even for the response between the sampling points. For the detailed description of this designing method, refer to Japanese Patent Laid-open No. 2001-127637.

MODIFICATION OF FIRST EMBODIMENT

Figure 6:
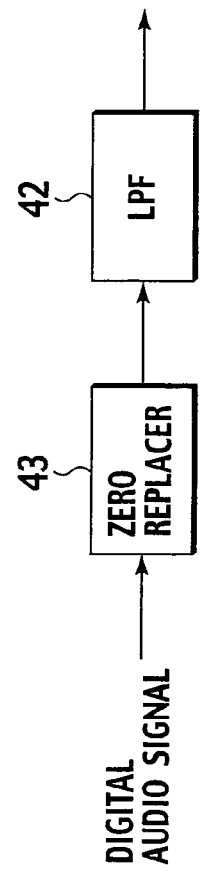
FIG. 6 is a block diagram showing a schematic configuration of a high frequency compensator according to a modification of the first embodiment of the present invention.

As shown in FIG. 6, a high frequency compensator according to a modification of the first embodiment includes a zero replacer 43 configured to replace even or odd sampling value of the digital audio signal to zero, instead of the down sampler 40 and the up sampler 41 shown in FIG. 2. An output signal of the zero replacer is supplied to the digital low-pass filter 42. As a result, it is possible to obtain an effect similar to the first embodiment.

According to the modification of the first embodiment, it is possible to provide a high frequency compensator capable of compensating the information lost through the compression of the digital audio data compressed with the high compression rate, by an easy method.

The high frequency compensator according to the modification of the first embodiment can obtain similar effect of the first embodiment by applying not only the compressed and expanded digital audio signal but also a digital audio signal having no high frequency component.

SECOND EMBODIMENT

Figure 7:
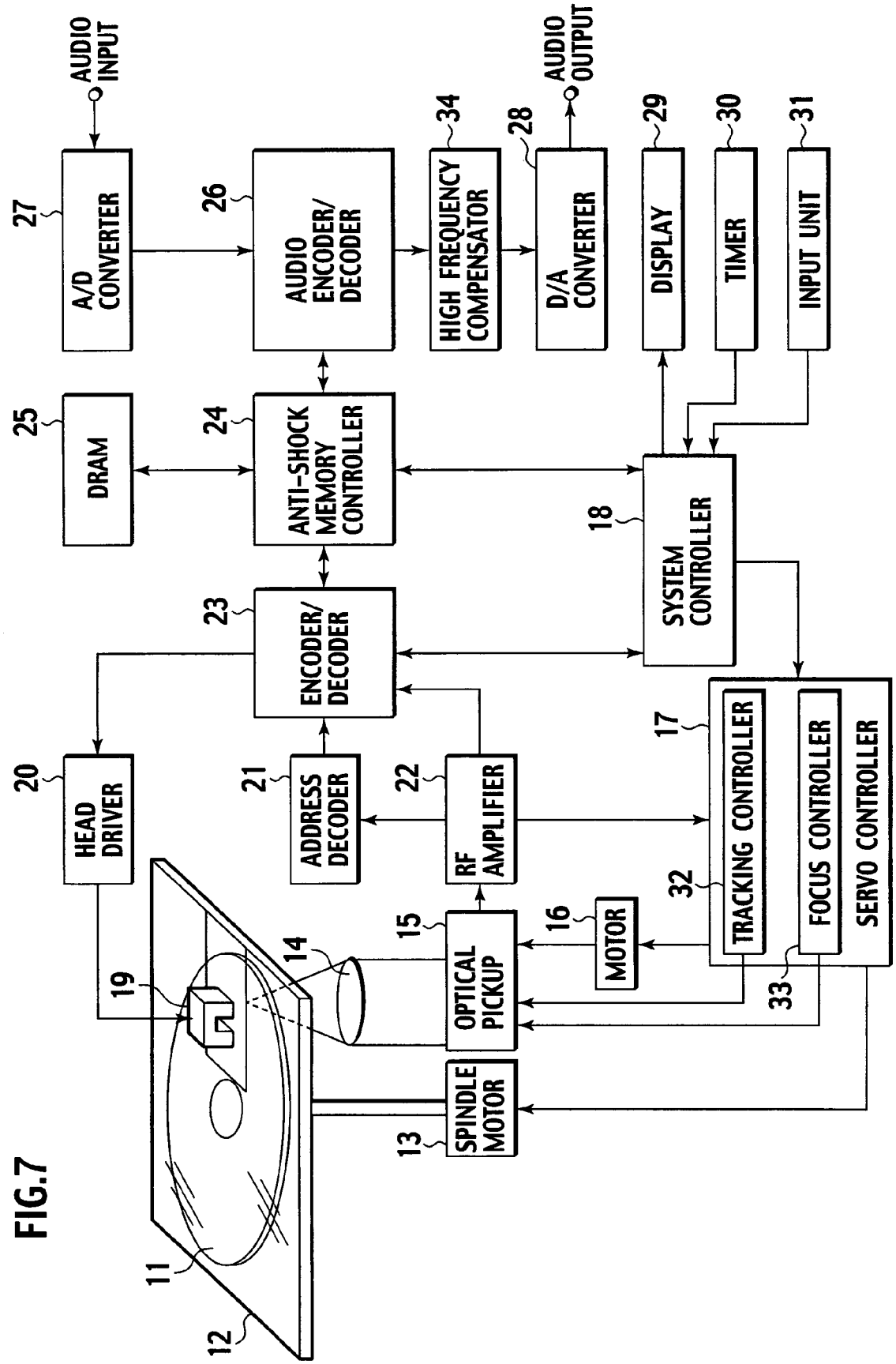
FIG. 7 is a block diagram showing an example of a configuration of a reproducing device according to a second embodiment of the present invention.

FIG. 7 is a block diagram showing a configuration of an optical disk device as a reproducing device according to a second embodiment of the present invention. The optical disk device is a mini disk device capable of recording and reproducing. A cartridge 12, which stores a mini disk 11 therein, with a square planar shape is loaded on the mini disk device. In this sate, shutters on both sides of the cartridge 12 are opened, and an optical pickup 15 carries out reading from one side of the mini disk 11 through an object lens 14. At the time of recording, magnetic field is applied to the other side of the mini disk 11 by a magnetic head 19.

The mini disk 11 is driven to rotate by a spindle motor 13 so as to have a predetermined constant linear velocity. The optical pickup 15 is driven by a motor 16 and moves in a radial direction of the mini disk 11. The magnetic head 19 is driven by a head driver 20 at the time of recording and moves in a radial direction of the mini disk 11, and its position is controlled in order that the magnetic head 19 sandwiches the same track together with the optical pickup 15.

The spindle motor 13, the optical pickup 15, and the motor 16 are driven by a servo controller 17. In addition, the servo controller 17 includes a tracking controller 32 and a focus controller 33. A signal detected by the optical pickup 15 is transmitted to a radio frequency (RF) amplifier 22 to be amplified. A focus error signal and a tracking error signal among signals amplified by the RF amplifier 22 are supplied to the focus controller 33 and the tracking controller 32, respectively.

An address signal among the signals amplified by the RF amplifier 22 is transmitted to an address decoder 21 to be decoded, and supplied to an encoder/decoder 23. The address signal decoded by the encoder/decoder 23 is utilized for the position control of the magnetic head 19 by the head driver 20. In addition, the address signal decoded by the encoder/decoder 23 is transmitted to a system controller 18, and used for the driving control of the spindle motor 13, the optical pickup 15, and the motor 16 by the servo controller 17.

A data signal among the signals amplified by the RF amplifier 22 is transmitted to the encoder/decoder 23 to be decoded, and is transmitted to a dynamic random access memory (DRAM) 25 through an anti-shock memory controller 24. The data (digital audio data) transmitted to the DRAM 25 is temporarily recorded therein, and then is transmitted to an audio encoder/decoder 26 through the anti-shock memory controller 24. The audio encoder/decoder 26 expands the transmitted data, and gives it to a high frequency compensator 34 as the high frequency compensator described in the first embodiment. The high frequency compensator 34 carries out the high frequency interpolation of the given data (digital audio signal) as described in the first embodiment. The digital signal with the compensated high frequency is output through a D/A converter 28.

The digital audio signal entered through an A/D converter 27 is compressed and encoded by the audio encoder/decoder 26, and is transmitted to the DRAM 25 through the anti-shock memory controller 24. The data transmitted to the DRAM 25 is temporarily recorded therein, and then is transmitted to the encoder/decoder 23 through the anti-shock memory controller 24 and is decoded therein. Subsequently, the data is recorded in the mini disk 11 by the magnetic head 19 and the optical pickup 15.

The anti-shock memory controller 24 and the DRAM 25 utilize a time difference of a time needed for recording to the DRAM 25 and a time needed for reading from the DRAM 25, thereby preventing sound skipping caused by vibration or the like. The system controller 18 is connected to a display 29, a timer 30, and an input unit 31, and controls operations of the servo controller 17, the encoder/decoder 23, and the anti-shock memory controller 24 while causing designated information displayed on the display 29 in response to the input, or the like, from the input unit 31.

According to the second embodiment, it is possible to compensate the information lost through the compression of the digital audio signal compressed with a high compression rate, and to obtain a reproduced sound approximate to the original sound before the compression.

OTHER EMBODIMENTS

Various modifications will become possible for those skilled in the art after receiving the teachings of the present disclosure without departing from the scope thereof.

What is claimed is:

1. A high frequency compensator configured to compensate high frequency component of a digital audio signal comprising:
    a down-sampler configured to perform ½ down-sampling for the digital audio signal;
    an up-sampler configured to perform double up-sampling for an output signal of the down-sampler; and
    a digital low-pass filter configured to filter an output signal of the up-sampler, and to output the filtered digital audio signal,
    wherein coefficients of the digital low-pass filter are calculated by using a signal decompression system model, the signal decompression system model including:
        an analog/digital converter configured to convert an original analog audio signal having a limited band into a digital signal;
        an infinite impulse response filter configured to perform oversampling for the digital signal;
        a digital/analog converter configured to convert the digital signal oversampled by the infinite impulse response filter into an analog signal; and
        a subtracter configured to calculate an error signal between the analog signal and the original analog audio signal, wherein coefficients of the infinite impulse response filter are calculated by Sampled-data H-Infinity control theory so as to decrease the error signal, and the coefficients of the digital low-pass filter are obtained from the calculated coefficients of the infinite impulse response filter.

2. A high frequency compensator configured to compensate high frequency component of a digital audio signal comprising:

a zero replacer configured to replace even or odd sampling value of the digital audio signal to zero; and a digital low-pass filter configured to filter an output signal of the zero replacer, and to output the filtered digital audio signal, wherein coefficients of the digital low-pass filter are calculated by using a signal decompression system model, the signal decompression system model including:

an analog/digital converter configured to convert an original analog audio signal having a limited band into a digital signal;

an infinite impulse response filter configured to perform oversampling for the digital signal;

a digital/analog converter configured to convert the digital signal oversampled by the infinite impulse response filter into an analog signal; and a subtracter configured to calculate an error signal of the analog signal from the original analog audio signal, wherein coefficients of the infinite impulse response filter are calculated by Sampled-data H-Infinity control theory so as to decrease the error signal, and the coefficients of the digital low-pass filter are obtained from the calculated coefficients of the infinite impulse response filter.

3. A reproducing device comprising a high frequency compensator according to one of claims 1 and 2, wherein a high frequency component of one of a digital audio signal read from a recording medium and a digital audio signal received from an external device is compensated by the high frequency compensator for reproducing the digital audio signal.

* * * * *